(12) United States Patent
VanBerlo

(10) Patent No.: US 10,327,382 B2
(45) Date of Patent: Jun. 25, 2019

(54) DEVICE FOR REMOVING VINES FROM SWEET POTATO AND THE LIKE

(71) Applicant: Peter Jerry VanBerlo, Ontario (CA)

(72) Inventor: Peter Jerry VanBerlo, Ontario (CA)

( * ) Notice: Subject to any disclaimer, the term of this patent is extended or adjusted under 35 U.S.C. 154(b) by 0 days.

(21) Appl. No.: 15/608,875

(22) Filed: May 30, 2017

(65) Prior Publication Data

US 2018/0343795 A1    Dec. 6, 2018

(51) Int. Cl.

| | |
|---|---|
| *A01D 33/06* | (2006.01) |
| *A01D 34/44* | (2006.01) |
| *A01D 57/12* | (2006.01) |
| *A01D 34/62* | (2006.01) |
| *A01D 34/60* | (2006.01) |

(52) U.S. Cl.
CPC ............ *A01D 34/44* (2013.01); *A01D 34/60* (2013.01); *A01D 34/62* (2013.01); *A01D 57/12* (2013.01)

(58) Field of Classification Search
CPC ...... A01B 39/085; A01D 23/04; A01D 23/02; A01D 25/044; A01D 25/048; A01D 33/06; A01D 34/8355; A01D 34/44; A01D 34/60; A01D 34/62; A01D 57/12; A01G 3/002
USPC ........ 56/14.7, 121.43, 312, 504; 171/28, 36, 171/58, 26; 460/127, 130, 140
See application file for complete search history.

(56) References Cited

U.S. PATENT DOCUMENTS

| | | |
|---|---|---|
| 1,974,346 A | 9/1934 | Seright |
| 2,473,450 A | 6/1949 | Rogers et al. |
| 2,504,365 A * | 4/1950 | Wallace ................. A01D 33/06 56/289 |
| 2,544,023 A * | 3/1951 | Johnson ................. A01D 33/06 171/24 |
| 2,649,678 A * | 8/1953 | Sishe ..................... A01D 33/06 56/13.6 |
| 2,953,209 A | 9/1960 | Marco |

(Continued)

FOREIGN PATENT DOCUMENTS

| | | |
|---|---|---|
| CN | 101911882 B | 5/2012 |
| FR | 2105717 A6 | 4/1972 |

(Continued)

OTHER PUBLICATIONS

TSP 1900 Sweet Potato Harvester Omega Separation Technology Twin Booms, Standen, pp. 4, www.standen.co.uk.

(Continued)

*Primary Examiner* — Robert E Pezzuto
(74) *Attorney, Agent, or Firm* — Knobbe, Martens, Olson & Bear, LLP

(57) ABSTRACT

A vine removal device comprises a frame and a pair of spaced-apart vine agitators movably carried by the frame so as to form a vine-feeding maw or throat between the vine agitators. A driven vine-cutter is movably carried by the frame and driven relative to the frame, and is disposed in registration with the maw to receive and cut vines fed into the maw by the vine agitators. One or more drive mechanisms are drivingly coupled to the vine-cutter and the vine agitators to drive the vine-cutter and the vine agitators. The vine agitators capture the vines and feed them into the maw, where the vines are cut into mulch by the vine-cutter. A vine removal implement may comprise a plurality of the vine removal devices arranged in side-by-side relation to traverse along a series of sweet potato rows.

15 Claims, 5 Drawing Sheets

(56) References Cited

U.S. PATENT DOCUMENTS

| | | | |
|---|---|---|---|
| 3,603,363 A | 9/1971 | Frankshtein | |
| 4,301,646 A | 11/1981 | Gates et al. | |
| 4,492,271 A | 1/1985 | Doering | |
| 4,751,812 A * | 6/1988 | Lubetzky | A01D 34/8355 171/58 |
| 4,934,461 A | 6/1990 | Spears et al. | |
| 4,967,848 A * | 11/1990 | Frankstein | A01D 23/04 171/36 |
| 5,330,114 A * | 7/1994 | Trenkamp | A01D 45/021 241/101.77 |
| 5,354,003 A * | 10/1994 | Stokes | A01D 34/8355 241/101.763 |
| 5,431,231 A * | 7/1995 | Abe | A01D 23/04 171/1 |
| 5,467,828 A * | 11/1995 | Ruozi | A01D 33/06 171/36 |
| 6,185,919 B1 * | 2/2001 | Borchard | A01D 34/8355 241/101.763 |

FOREIGN PATENT DOCUMENTS

| | | |
|---|---|---|
| FR | 2293129 A1 | 7/1976 |
| GB | 625507 A | 6/1949 |
| GB | 633207 A | 12/1949 |
| GB | 1301793 | 1/1973 |
| GB | 2056240 B | 3/1981 |
| JP | H 09313020 A | 12/1997 |
| JP | 2000287516 A | 10/2000 |
| JP | 2000287519 A | 10/2000 |
| JP | 3868110 B2 | 1/2007 |
| JP | 2007029034 A | 2/2007 |
| KR | 100652515 B1 | 11/2006 |
| NL | 7905829 A | 1/1981 |
| NL | 9101405 A | 3/1993 |
| NL | 1017527 C2 | 9/2002 |

OTHER PUBLICATIONS

Summer, Paul E., Harvesting, Curing and Storage of Sweet Potatoes, Cooperative Extension Service the University of Georgia College of Agriculture, Aug. 1984, pp. 9.

Sweet Potato, Potato Tire Vine Puller, Windrowing Unit at Clinton, 1973, North Carolina State University College of Agriculture Engineering Records, 1928-2008 (UA 100.014), https://web.archive.org/web/20150919141840/http://d.lib.ncsu.edu/collections/catalong/ua100_014-006-cn0057-011-001.

\* cited by examiner

DEVICE FOR REMOVING VINES FROM SWEET POTATO AND THE LIKE

TECHNICAL FIELD

The present disclosure relates to crop harvesting, and more particularly to removing the vines or "tops" from sweet potatoes and the like prior to harvesting.

BACKGROUND

In sweet potato farming, the vines from the sweet potatoes can grow quite long (up to 10 feet or more) and become entangled with one another, significantly complicating the task of harvesting the sweet potatoes. Typically removing the vines from the sweet potatoes has been done manually, and is a costly labor-intensive task.

SUMMARY

The present disclosure describes a device for cutting the vines away from sweet potatoes or similar crops.

In one aspect, a vine removal device comprises a frame and a pair of spaced-apart vine agitators movably carried by the frame so as to form a vine-feeding maw or throat between the vine agitators. A driven vine-cutter is movably carried by the frame and driven relative to the frame, and is disposed in registration with the maw to receive and cut vines fed into the maw by the vine agitators. One or more drive mechanisms are drivingly coupled to the vine-cutter and the vine agitators to drive the vine-cutter and the vine agitators. The vine agitators capture the vines and feed them into the maw, where the vines are cut into mulch by the vine-cutter.

In some embodiments, the vine-cutter comprises at least one vine-cutting shaft rotatably carried by the frame, and each vine-cutting shaft carries a plurality of longitudinally-spaced vine-cutting blades extending outwardly from the respective vine-cutting shaft. In certain preferred embodiments, the vine-cutting blades are pivotally carried by the vine-cutting shaft.

In some embodiments, the vine agitators are counter-rotating vine agitators rotatably carried by the frame. In certain preferred embodiments, each of the vine agitators comprises a vine-capturing shaft carrying a plurality of longitudinally-spaced vine-engaging tines extending outwardly from the respective vine-capturing shaft. Preferably, the vine-engaging tines are spring-mounted to the vine-capturing shafts.

The vine-engaging tines and the vine-cutting blades may be interdigitated with one another.

In some embodiments, the frame is coupled to a guide wheel adapted to trace along a ridge of a sweet potato row, and a height adjustment mechanism is interposed between the frame and the guide wheel for adjusting the height of the frame relative to the guide wheel. A wheel scraper may be carried by the frame so as to engage a tread of the guide wheel to scrape mud off the guide wheel.

In some embodiments, a vine-cutter drive mechanism is drivingly coupled to the vine-cutter to drive the vine-cutter and at least one vine agitator drive mechanism is drivingly coupled to the vine agitators to drive the vine agitators.

A vine removal implement may comprise a plurality of the vine removal devices described above arranged in side-by-side relation.

In another aspect, a vine removal device comprises a frame, a pair of spaced-apart vine-capturing shafts rotatably carried by the frame and a vine-cutting shaft rotatably carried by the frame and positioned between and surmounting the vine-capturing shafts. Each of the vine-capturing shafts carries a series of spaced-apart, outwardly projecting tines and the vine-cutting shaft carries a series of spaced-apart, outwardly projecting blades, with the tines being longitudinally interposed between the blades. At least one drive mechanism is drivingly coupled to the vine-capturing shafts and to the vine-cutting shaft to drive rotation thereof.

In certain preferred embodiments, the vine-capturing shafts are substantially parallel to one another, and in yet further preferred embodiments, the vine-cutting shaft is substantially parallel to the vine-capturing shafts.

Preferably, the tines are spring-mounted to the vine-capturing shafts, and also preferably the blades are pivotally mounted to the vine-cutting shaft.

In some embodiments, the frame is coupled to a guide wheel adapted to trace along a ridge of a sweet potato row and a height adjustment mechanism is interposed between the frame and the guide wheel for adjusting the height of the frame relative to the guide wheel. A wheel scraper may be carried by the frame and positioned to engage a tread of the guide wheel to scrape mud off the guide wheel.

A vine removal implement may comprise a plurality of the above-described vine removal devices arranged in side-by-side relation.

BRIEF DESCRIPTION OF THE DRAWINGS

These and other features will become more apparent from the following description in which reference is made to the appended drawings wherein.

DETAILED DESCRIPTION

Figure 1:
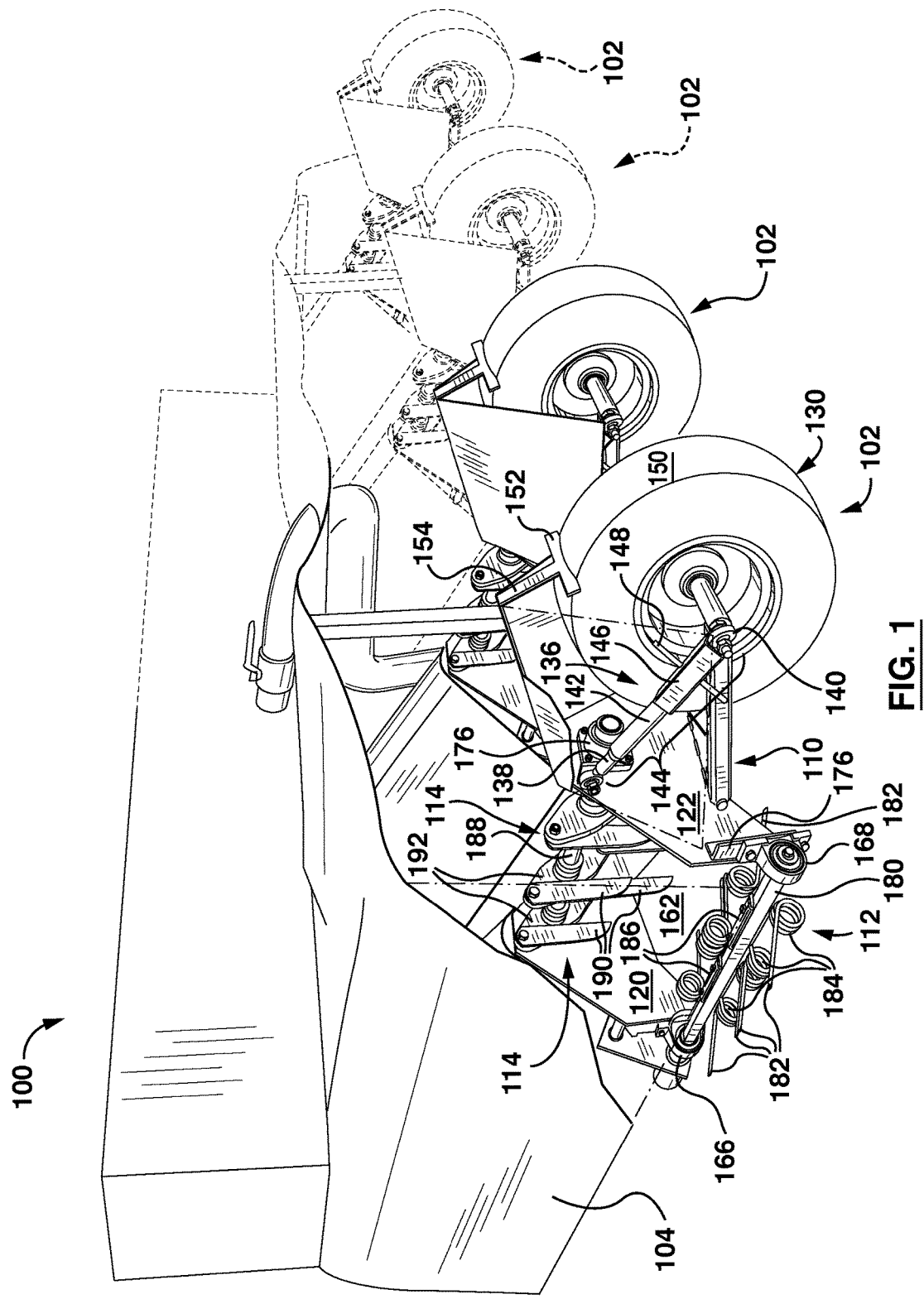
FIG. 1 shows a top perspective view of an exemplary vine removal implement comprising a plurality of exemplary vine removal devices according to the present disclosure arranged in side-by-side relation to traverse along a series of sweet potato rows.

Reference is first made to FIG. 1, which shows an exemplary vine removal implement 100. The vine removal implement 100 comprises a plurality of individual vine removal devices 102 arranged in side-by-side relation to traverse along adjacent rows of sweet potatoes or similar crops. While the exemplary vine removal implement 100 shown in FIG. 1 comprises four individual vine removal devices 102, this is merely for purposes of illustration; a vine removal implement according to the present disclosure may comprise more or fewer individual vine removal devices. The vine removal implement 100 may be removably coupled to a tractor or other vehicle so as to be towed along the rows of crops, or may be implemented as a self-propelled vehicle. The vine removal device 102, or part thereof, may optionally be covered by one or more protective shrouds 104.

Figure 2:
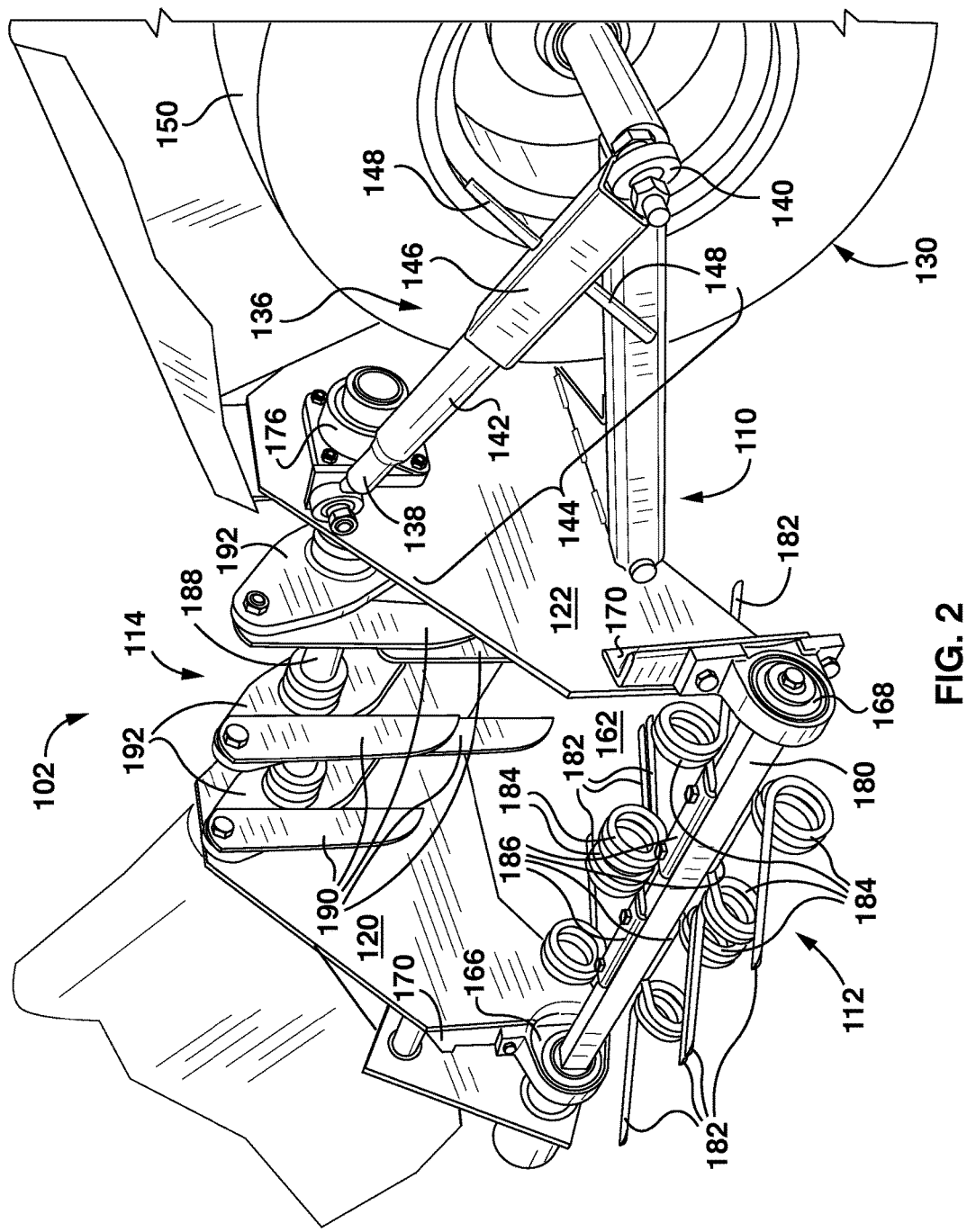
FIG. 2 is a perspective view of one of the vine removal devices of FIG. 1.
Figure 3:
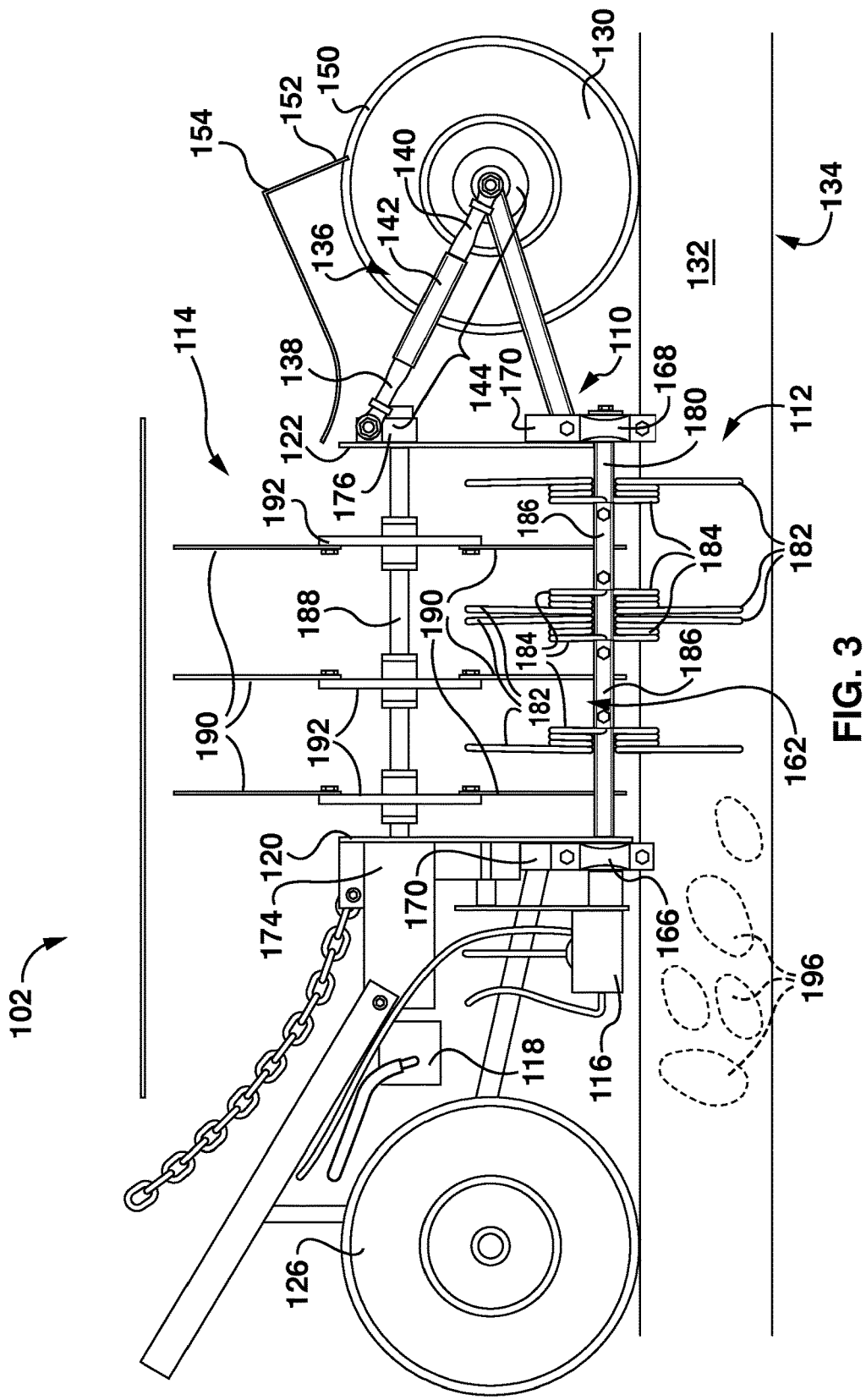
FIG. 3 is a side view of one of the vine removal devices of FIG. 1 positioned on a sweet potato row.

Reference is now made to FIGS. 2 to 5, where one of the individual vine removal devices 102 is illustrated in more detail. The exemplary vine removal device 102 comprises a frame 110, a pair of spaced-apart vine agitators 112, a driven vine-cutter 114, and drive mechanisms 116, 118 (FIG. 3). In the illustrated embodiment, the frame 110 comprises two spaced-apart fore and aft end plates 120, 122. The fore end plate 120 is coupled to a leading wheel 126 (FIGS. 3 and 5) and the aft end plate 122 is coupled to a trailing guide wheel 130. The guide wheel 130 is adapted to trace along a ridge 132 (FIGS. 3 and 4) of a sweet potato row 134. A height adjustment mechanism, indicated generally by reference 136, is interposed between the frame 110 and the guide wheel 130 for adjusting the height of the frame 110 relative to the guide wheel 130 and thereby adjusting the height of the frame 110 relative to the ridge 132. In the illustrated embodiment, the height adjustment mechanism 136 comprises two oppositely threaded rods 138, 140 and a correspondingly internally threaded cylinder 142 (FIG. 3). A pivot end of one of the rods 138 is pivotally coupled to the aft end plate 122 and a pivot end of the other rod 140 is pivotally coupled to the guide wheel 130, with the other ends of the rods 138, 140 being threadedly received in the cylinder 142 so as to form an adjustable-length strut 144 extending between the aft end plate 122 and the guide wheel 130. By rotating the cylinder 142, the adjustable-length strut 144 can be lengthened or shortened (depending on the direction of rotation) to adjust the distance of the aft end plate 122 from the guide wheel 130 and thereby adjust the height of the frame 110 relative to the ridge 132.

In a preferred embodiment, the cylinder 142 and the rod 140 that is pivotally coupled to the guide wheel 130 are provided with square external fittings (not shown) and a correspondingly sized locking sleeve 146 (FIG. 2) of square cross-section is received over the adjustable-length strut 144. When the locking sleeve 146 is positioned with both square internal fittings within the locking sleeve 146, the cylinder 142 cannot rotate relative to the rods 138, 140, thereby locking the adjustable-length strut 144 at a desired length. By sliding the locking sleeve 146 so that only the square external fitting on the cylinder 142 is disposed therewithin, the locking sleeve 146 can be used as an aid in rotating the cylinder 142 relative to the rods 138, 140 and the locking sleeve 146 is provided with handles 148 for this purpose. While in the illustrated embodiment the external fittings and locking sleeve 146 are square, any suitable shape (e.g. other polygonal shapes) may applied to the external fittings and locking sleeves.

If any significant amount of mud accumulates on the tread 150 of the guide wheel 130, the mud layer can change the effective diameter of the guide wheel 130 and thwart the height adjustment mechanism 136. Therefore, as best seen in FIGS. 1 and 3, a wheel scraper 152 is carried by the frame 110 and engages the tread 150 of the guide wheel 130 to scrape mud off the guide wheel 130. In the illustrated embodiment, the wheel scraper 152 is carried by an arm 154 extending from the aft end plate 122.

The height adjustment mechanism 136 shown in the Figures and described above is merely exemplary, and any suitable height adjustment mechanism may be used. The purposed of the height adjustment mechanism 136 will be described further below.

Figure 4:
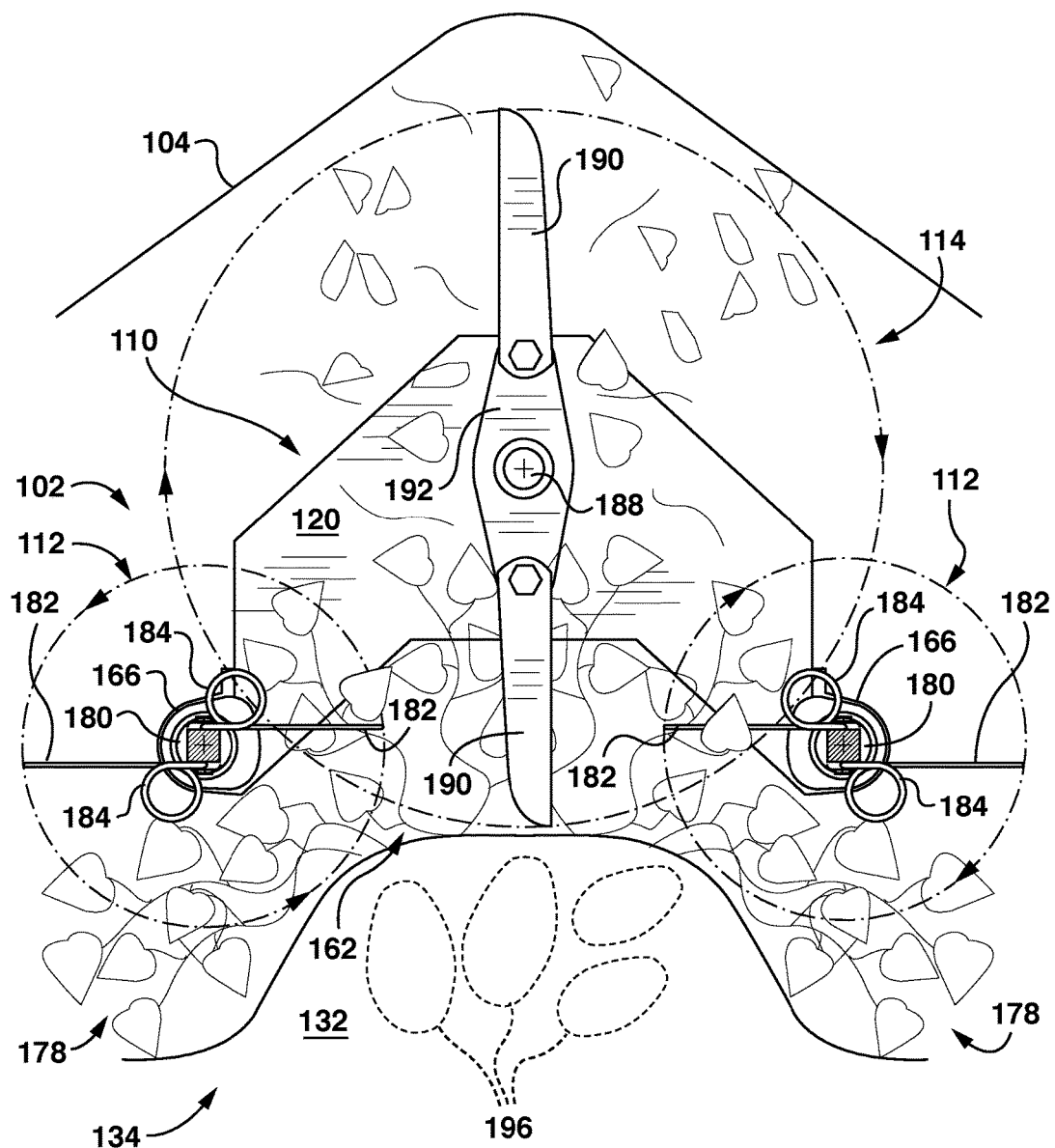
FIG. 4 is a front elevation interior schematic view of one of the vine removal devices of FIG. 1 positioned on a sweet potato row.

Continuing to refer to FIGS. 2 to 5, a pair of spaced-apart vine agitators 112 is movably carried by the frame 110. As best seen in FIG. 4, the vine agitators 112 are positioned to form a longitudinally-extending vine-feeding maw or "throat" 162 between the vine agitators 112; as can be seen in FIG. 4, in operation the ridge 132 of the sweet potato row 134 will be in longitudinal registration with the maw 162.

Figure 5:
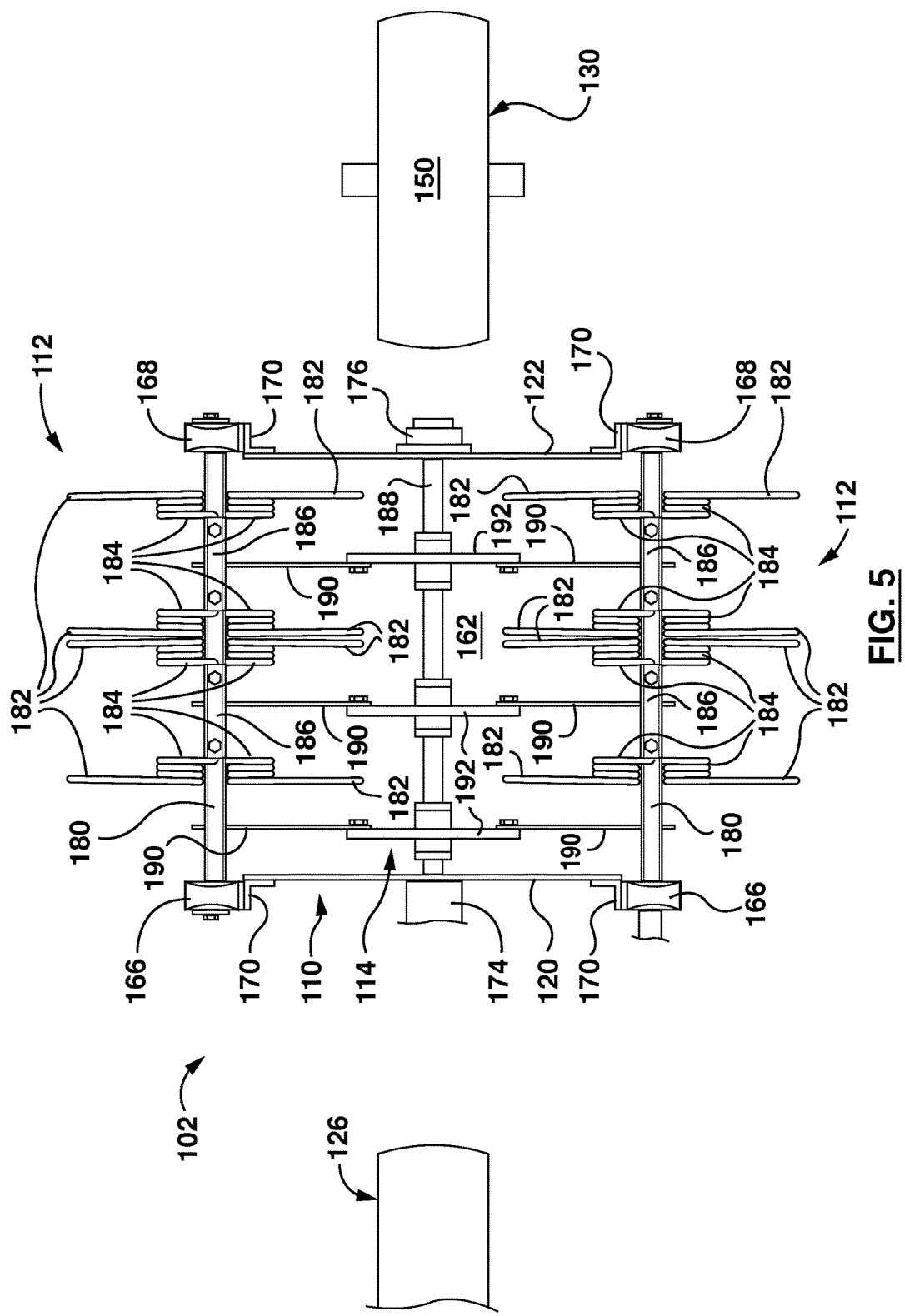
FIG. 5 is a bottom plan interior schematic view of one of the vine removal devices of FIG. 1.

Referring now primarily to FIG. 5, in the illustrated embodiment the vine agitators 112 extend between the fore end plate 120 and the aft end plate 122 and are journaled in respective fore and aft bearings 166, 168 fixed to the fore end plate 120 and the aft end plate 122 by L-shaped brackets 170. As such, in the illustrated embodiment the vine agitators 112 are rotatable relative to the fore end plate 120 and the aft end plate 122 and hence the vine agitators 112 are rotatably carried by the frame 110.

As also noted above, a driven vine-cutter 114 is also movably carried by the frame 110. As can be seen in the drawings, the vine-cutter 114 is a separate and distinct element from the vine agitators 112. Like the vine agitators 112, in the illustrated embodiment the is journaled in respective fore and aft bearings 174, 176 fixed to the fore end plate 120 and the aft end plate 122 so that the vine-cutter 114 can rotate relative to the end plates 120, 122 and hence relative to the frame 110. As best seen in FIG. 4, the vine-cutter 114 is disposed in registration with the maw 162 formed by the vine agitators 112 so that the vine-cutter 114 is positioned to receive and cut vines 178 fed into the maw 162 by the vine agitators 112, as described further below.

In one embodiment, as shown in the drawings, each of the vine agitators 112 comprises a single vine-capturing shaft 180 of square cross-section and carrying a plurality of longitudinally-spaced vine-engaging tines 182 extending outwardly from the respective vine-capturing shaft 180. In other embodiments, each vine agitator may comprise, for example, two or more vine-capturing shafts, and/or may have other configurations. Preferably, the vine-engaging tines 182 are spring-mounted to the vine-capturing shafts 180, and in the illustrated embodiment the vine-engaging tines 182 include integrally formed coil spring portions 184 adjacent the inner ends thereof. Mounting plates 186 are bolted to the vine-capturing shafts 180 so as to secure the inner ends of the vine-engaging tines 182 to the vine-capturing shafts 180 and thereby mount the vine-engaging tines 182 on the vine-capturing shafts 180. In the exemplary embodiment shown in the Figures, each of the vine-capturing shafts 180 includes four sets of two vine-engaging tines 182, with each set of two vine-engaging tines 182 arranged substantially in longitudinal registration with a counterpart on the opposite side of the respective vine-capturing shaft 180. This is merely one exemplary embodiment, and other numbers and configurations of vine-engaging tines 182 are also contemplated within the scope of the present disclosure.

In the illustrated embodiment the vine-cutter 114 comprises a single vine-cutting shaft 188 rotatably carried by the frame (by way of fore and aft bearings 174, 176) and carrying a plurality of longitudinally-spaced vine-cutting blades 190 extending outwardly from the respective vine-cutting shaft 186. In other embodiments, more than one vine-cutting shaft may be provided, and/or the vine-cutting shaft(s) may have other configurations. Preferably, the vine-cutting blades 190 are pivotally carried by the vine-cutting shaft 186. In the illustrated embodiment, outwardly extending blade mountings 192 are fixed to the vine-cutting shaft 186 and the vine-cutting blades 190 are coupled to the blade mountings 192 so as to be freely pivotable relative to the blade mountings 192. Thus, when the vine-cutting shaft 186 is static, the vine-cutting blades 190 will hang under gravity, as shown in FIGS. 1 and 2, and when the vine-cutting shaft 186 is rotated at sufficient speed, the vine-cutting blades 190 will pivot outwardly, as shown in FIGS. 3 to 5. While the exemplary vine-cutter 114 shown in the drawings has three blade mountings 192 each having two diametrically opposed vine-cutting blades 190, other numbers and configurations of blades and blade mountings are also contemplated within the scope of the present disclosure.

As best seen in FIGS. 3 and 5, the vine-engaging tines 182 and the vine-cutting blades 190 are interdigitated with one another; that is, the vine-engaging tines 182 and the vine-cutting blades 190 are longitudinally interposed between one another. As can be seen in FIGS. 3 to 5, in the illustrated embodiment the vine-capturing shafts 180 are substantially parallel to one another, and the vine-cutting shaft 186 is substantially parallel to the vine-capturing shafts 180 and is positioned between and surmounting the vine-capturing shafts 180.

The vine agitators 112 and the vine-cutter 114 are driven relative to the frame, and at least one drive mechanism is drivingly coupled to the vine agitators 112 and the vine-cutter 114 to drive the vine agitators 112 and the vine-cutter 114. In the illustrated embodiment, two separate drive mechanisms are used; a vine agitator drive mechanism 116 is drivingly coupled to the vine agitators 112 to drive the vine agitators and a vine-cutter drive mechanism 118 is drivingly coupled to the vine-cutter 114 to drive the vine-cutter 114. The vine agitator drive mechanism 116 and the vine agitators 112 are configured so that the vine agitators 112 are counter-rotating, as best seen in FIG. 4. In the illustrated embodiment a single vine agitator drive mechanism 116 drives both of the vine agitators 112; in other embodiments each vine agitator may have an independent drive mechanism.

The vine agitator drive mechanism 116 and the vine-cutter drive mechanism 118 may be of any suitable type; in one preferred embodiment pneumatic motors are used. The use two separate drive mechanisms allows the vine agitators 112 and the vine-cutter 114 to be rotated at different speeds without the need for complex gearing or other mechanical couplings. In one preferred embodiment, the vine agitators 112 are rotated at about 400 RPM and the vine-cutter 114 is rotated at about 1200 RPM.

In operation, the vine removal device 102 moves along a row 134 of sweet potatoes 196 with the guide wheel 130 disposed atop the ridge 132 of the row, as shown in FIGS. 3 and 4. Prior to traversing the row 134, the height adjustment mechanism 136 is used to adjust the height of the frame 110 relative to the guide wheel 130, and thereby adjust the height of the frame 110 relative to the ridge 132, so that when the vine-cutter 114 is rotated the vine-cutting blades 190 will just clear the top of the ridge 132. As can be seen in FIG. 4, the ridge 132 is disposed longitudinally between the vine agitators 112 and in longitudinal registration with the vine-cutter 114. As the vine removal device 102 moves along the row 134 of sweet potatoes 196, the vine agitators 112 capture the vines 178 and feed them into the maw 162, where the vines 178 are cut into mulch by the vine-cutter 114. More particularly, in the illustrated embodiment the vine-capturing shafts 180 are counter-rotated relative to one another so that the vine-engaging tines 182 ensnare the vines 178 and propel the vines 178 upwardly and inwardly toward the vine-cutting shaft 186, whose vine-cutting blades 190 pulverize the vines 178. The spring mounting of the vine-engaging tines 182 and the pivotal mounting of the vine-cutting blades 190 allows for deflection should one of the vine-engaging tines 182 and/or one of the vine-cutting blades 190 strike a rock or other hard object.

Certain exemplary embodiments have been described by way of example. It will be apparent to persons skilled in the art that a number of variations and modifications can be made without departing from the scope of the claims.

What is claimed is:

1. A vine removal device, comprising:
   a frame;
   a pair of spaced-apart vine agitators movably carried by the frame so as to form a vine-feeding maw between the vine agitators, wherein each of the vine agitators comprises a vine-capturing shaft carrying a plurality of longitudinally-spaced vine-engaging tines extending outwardly from the respective vine-capturing shaft;
   a driven vine-cutter movably carried by the frame and driven relative to the frame, wherein:
     the vine-cutter is disposed in registration with the maw to receive and cut vines fed into the maw by the vine agitators;
     the vine-cutter comprises at least one vine-cutting shaft rotatably carried by the frame; and
     each vine-cutting shaft carries a plurality of longitudinally-spaced vine-cutting blades extending outwardly from the respective vine-cutting shaft, the vine-cutting blades being pivotally carried by the vine-cutting shaft; and
   at least one drive mechanism drivingly coupled to the vine-cutter and the vine agitators to drive the vine-cutter and the vine agitators;
   whereby the vine agitators capture the vines and feed them into the maw, where the vines are cut into mulch by the vine-cutter.

2. The vine removal device of claim 1, wherein the vine agitators are counter-rotating vine agitators rotatably carried by the frame.

3. The vine removal device of claim 1, wherein the vine-engaging tines are spring-mounted to the vine-capturing shafts.

4. The vine removal device of claim 3, wherein the vine-engaging tines and the vine-cutting blades are interdigitated with one another.

5. The vine removal device of claim 1, wherein:
   the frame is coupled to a guide wheel adapted to trace along a ridge of a sweet potato row; and
   a height adjustment mechanism is interposed between the frame and the guide wheel for adjusting the height of the frame relative to the guide wheel.

6. The vine removal device of claim 5, wherein a wheel scraper is carried by the frame and engages a tread of the guide wheel to scrape mud off the guide wheel.

7. The vine removal device of claim 1, wherein the at least one drive mechanism comprises:
   a vine-cutter drive mechanism drivingly coupled to the vine-cutter to drive the vine-cutter; and
   at least one vine agitator drive mechanism drivingly coupled to the vine agitators to drive the vine agitators.

8. A vine removal implement comprising a plurality of the vine removal devices of claim 1 arranged in side-by-side relation.

9. A vine removal device, comprising:
   a frame;
   a pair of spaced-apart vine-capturing shafts rotatably carried by the frame, each of the vine-capturing shafts carrying a series of spaced-apart, outwardly projecting tines;
   at least one vine-cutting shaft rotatably carried by the frame and positioned between and surmounting the vine-capturing shafts, wherein:
     each vine-cutting shaft carries a plurality of longitudinally-spaced vine-cutting blades extending outwardly from the respective vine-cutting shaft, the vine-cutting blades being pivotally carried by the vine-cutting shaft;

the tines being longitudinally interposed between the blades; and at least one drive mechanism drivingly coupled to the vine-capturing shafts and to the vine-cutting shaft to drive rotation thereof.

10. The vine removal device of claim 9, wherein the vine-capturing shafts are substantially parallel to one another.

11. The vine removal device of claim 10, wherein the at least one vine-cutting shaft is substantially parallel to the vine-capturing shafts.

12. The vine removal device of claim 9, wherein the tines are spring-mounted to the vine-capturing shafts.

13. The vine removal device of claim 9, wherein:
the frame is coupled to a guide wheel adapted to trace along a ridge of a sweet potato row; and
a height adjustment mechanism is interposed between the frame and the guide wheel for adjusting the height of the frame relative to the guide wheel.

14. The vine removal device of claim 13, wherein a wheel scraper is carried by the frame and engages a tread of the guide wheel to scrape mud off the guide wheel.

15. A vine removal implement comprising a plurality of the vine removal devices of claim 9 arranged in side-by-side relation.

* * * * *